United States Patent [19]

Nussle

[11] Patent Number: 5,167,204
[45] Date of Patent: Dec. 1, 1992

[54] LITTER BOX

[76] Inventor: Ron L. Nussle, 35 Ward Dr. South, Danbury, Conn. 06810

[21] Appl. No.: 789,908

[22] Filed: Nov. 12, 1991

[51] Int. Cl.⁵ .............................................. A01K 29/00
[52] U.S. Cl. ..................................... 119/166; 209/634
[58] Field of Search ............... 119/161, 162, 165, 166, 119/168; 209/634, 635, 660, 691, 352, 373; 4/471, 474, 476

[56] References Cited

U.S. PATENT DOCUMENTS

| | | | |
|---|---|---|---|
| 2,713,321 | 7/1955 | Keen | 119/1 |
| 3,141,441 | 7/1964 | Russell | 119/1 |
| 3,233,588 | 2/1966 | Thomas | 119/1 |
| 3,482,546 | 12/1969 | Anderson | 119/1 |
| 4,096,827 | 6/1978 | Cotter | 119/1 |
| 4,120,264 | 10/1978 | Carter | 119/166 |
| 4,190,525 | 2/1980 | Menzel | 209/235 |
| 4,325,325 | 4/1982 | Larter | 119/166 |
| 4,327,667 | 5/1982 | Bilak | 119/166 |
| 4,444,148 | 4/1984 | Lander | 119/166 X |
| 4,574,735 | 3/1986 | Hohenstein | 119/166 X |
| 4,593,645 | 6/1986 | Dingler | 119/165 |
| 4,802,442 | 2/1989 | Wilson | 119/1 |
| 4,817,560 | 4/1989 | Prince | 119/1 |
| 4,846,104 | 7/1989 | Pierson | 119/1 |
| 4,886,014 | 12/1989 | Sheriff | 119/1 |
| 5,012,765 | 5/1991 | Naso et al. | 119/166 |

Primary Examiner—Gene Mancene
Assistant Examiner—Thomas Price

[57] ABSTRACT

A litter box has a tray having a bottom and an outlet at one end of the tray and a sifting element disposed within the tray and having a screen portion and a solid portion, the screen portion being disposed at an angle, facing the outlet of the tray, of 90 degrees or less as measured from the bottom of the tray to the screen portion, and the solid portion extending from the sceen portion to the outlet of the tray. The litter box may also have a base pivotably connected to the tray so that the tray can be lifted in a pivot motion relative to the base, a shutter, disposed at the outlet of the tray, the shutter being vertically slidable between a raised position and a lowered position, and a receptacle, mounted to the tray and adjacent to the shutter, and having an inlet arranged so that, when the shutter is in the raised position, the outlet of the tray and the inlet of the receptacle are blocked, and when the tray is pivoted, the shutter drops to the lowered position to allow passage from the outlet of the tray to the inlet of the receptacle.

11 Claims, 12 Drawing Sheets

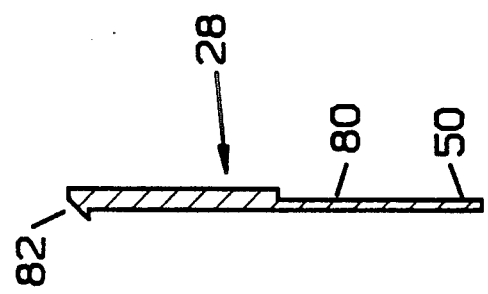
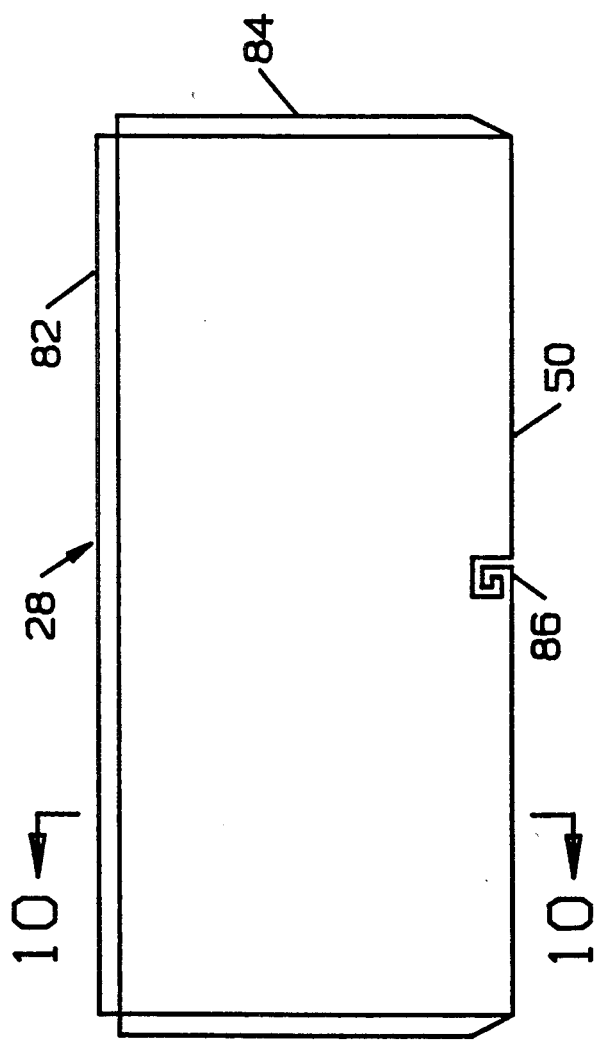

LITTER BOX

BACKGROUND OF THE INVENTION

1. Field of the Invention

The invention is in the field of pet care and, more particularly, is a self-cleaning litter box for waste disposal.

2. Description of the Related Art

Various designs have been proposed for litter boxes having devices to make cleaning the litter in the box easier. These devices typically involve sifting screens which remove feces from litter when the litter is sifted through the screens.

For example, U.S. Pat. No. 3,141,441 to Russell discloses a litter box having two containers, one of which has a grating in the bottom, and a solid sheet which lies over the grating. When it is time to clean the box, the solid sheet is removed and the box with the grating is lifted out of the solid box. The litter sifts through the grating and into the solid-bottom box, while the feces remains in the box with the grating, and is then discarded. The solid sheet is then replaced in the grated box and the litter is poured back in this box for re-use.

This box allows the litter to be sifted. This sifting however, requires multiple lifting of the box with the litter, a task which may not be easy for the elderly or infirm pet keeper. Also, the feces must be discarded after each use of the sifter, and the sifting process can result in spillage of the litter unless the boxes are kept in alignment.

U.S. Pat. No. 3,482,546 to Anderson discloses a litter box having a tilting screen in the bottom. When it is time to clean the box, the screen is lifted through the litter and waste materials are caught by the screen and collected in the tray.

This device also allows the removal of feces from litter, but again requires that the feces be disposed of after each cleaning of the litter box. Further, during use of the device, litter as well as feces will be discharged through the opening 18 (FIG. 2) of the litter box. Also, difficulty is encountered when replacing the grating for use, as the grating must be forced back into position through the litter.

U.S. Pat. No. 4,096,827 to Cotter discloses a litter box which is structured like a briefcase and has two portions with a screen disposed therebetween. In use, the device is opened and one side lies flat on the floor. The other side remains vertical and is not used. When it is time to clean the box, the non-used side is closed over the used side and the box is inverted. The litter passes through the screen, and feces are caught and maintained in the first side. The box is then opened in an upside down position to the original position and the feces may be removed.

This device also provides effective sifting of litter, but still involves lifting of the entire litter box to effect the sifting, and feces must be disposed of after each sifting.

U.S. Pat. No. 4,886,014 to Sheriff discloses a pet litter box having two semi-circular swelled out chutes 22 and a wire mesh separator 24. While this device also appears to provide effective sifting of waste material, its operation requires a lifting of the entire box and at least 5 steps to operate, as follows: 1) lifting and tilting the box to collect litter in the side chute 22; 2) tilting the box to transfer the collected litter to the end chute 22; 3) lowering the box so that the collected litter is sifted through the wire mesh 24; 4) tilting the box to empty waste material from the wire mesh 24; and 5) setting the box flat while redistributing the litter for further use.

Other patents which disclose sifting type litter boxes include U.S. Pat. No. 2,713,321 to Keen; U.S. Pat. No. 3,233,588 to Thomas; U.S. Pat. No. 4,190,525 to Menzel; U.S. Pat. No. 4,802,442 to Wilson; U.S. Pat. No. 4,817,560 to Prince et al.; and U.S. Pat. No. 4,846,103 to Pierson, Jr.

All of the above devices require intricate procedures to effect the screening of the litter. It is, therefore, desirable to provide a litter box wherein the cleaning procedure is simple.

An additional shortcoming of the above-described known devices is their inability to provide an easy manner of disposal of the litter when it is used to the point where the litter must also be discarded and replaced.

Thus, the objects of the present invention include:

1. providing a litter box which can be operated in a simple procedure without excessive lifting or shaking of the litter box;
2. providing a receptacle for the litter box which catches and stores sifted feces in a substantially airtight container;
3. providing a litter box capable of easily redistributing the litter for additional use after it is sifted;
4. providing a litter box which allows easy and sanitary disposal of the feces as well as the litter when it is no longer usable.

SUMMARY OF THE INVENTION

These objects and others are obtained by a litter box which comprises a tray for holding the litter, the tray having an outlet at one end, and a sifting element disposed within the tray and having a screen portion disposed at an angle to the bottom of the tray and an at least partially solid portion disposed substantially parallel to the bottom of the tray.

The invention preferably further comprises pivot means for pivotably connecting the tray to a base, the pivot means preferably comprising at least one lever allowing the tray to be pivotably lifted relative to the base; a shutter slidably affixed to the outlet end of the tray so that when the tray is lifted, the shutter drops to allow passage through the outlet of the tray; and a receptacle mounted to the tray, adjacent to the shutter, and having an inlet, so that when the tray is in the non-pivoted position, the shutter blocks the outlet of the tray and the inlet of the receptacle, and when the tray is lifted and pivoted, the shutter drops to allow free passage from the outlet of the tray to the inlet of the receptacle.

When cleaning is necessary, the tray is tilted or pivoted so that all litter is sifted through the sifting element. The litter passes through the sifting element and is caught between the tray and the solid portion of the sifting element. The waste material is caught by the screen portion of the sifting element and passes over the solid portion of the screening element and through the outlet of the tray, over the lowered shutter and into the inlet of the receptacle. When the tray is lowered, the litter falls back into place and the receptacle is sealed by the shutter so that offensive smells cannot escape into the atmosphere.

Optionally, the sifting element may be made removable from the tray, and the receptacle may also be removable and disposable. Thus, when the litter has been used and re-used to the point where it is to be discarded, removal of the sifting element allows all litter and waste to be poured into the receptacle which can then be removed and discarded. A new receptacle can then be installed and new litter placed in the tray to ready the box for use.

BRIEF DESCRIPTION OF THE DRAWINGS

These and other objects of the invention will become readily apparent in the following detailed description of the invention, with reference to the accompanying drawings, in which:

FIG. 9 is a front view of a shutter element, according to the invention;

FIG. 10 is a cross section taken along the lines 10—10 of FIG. 9;

FIG. 11 is a top view of the shutter of FIG. 9;

DESCRIPTION OF THE PREFERRED EMBODIMENT

Figure 1:
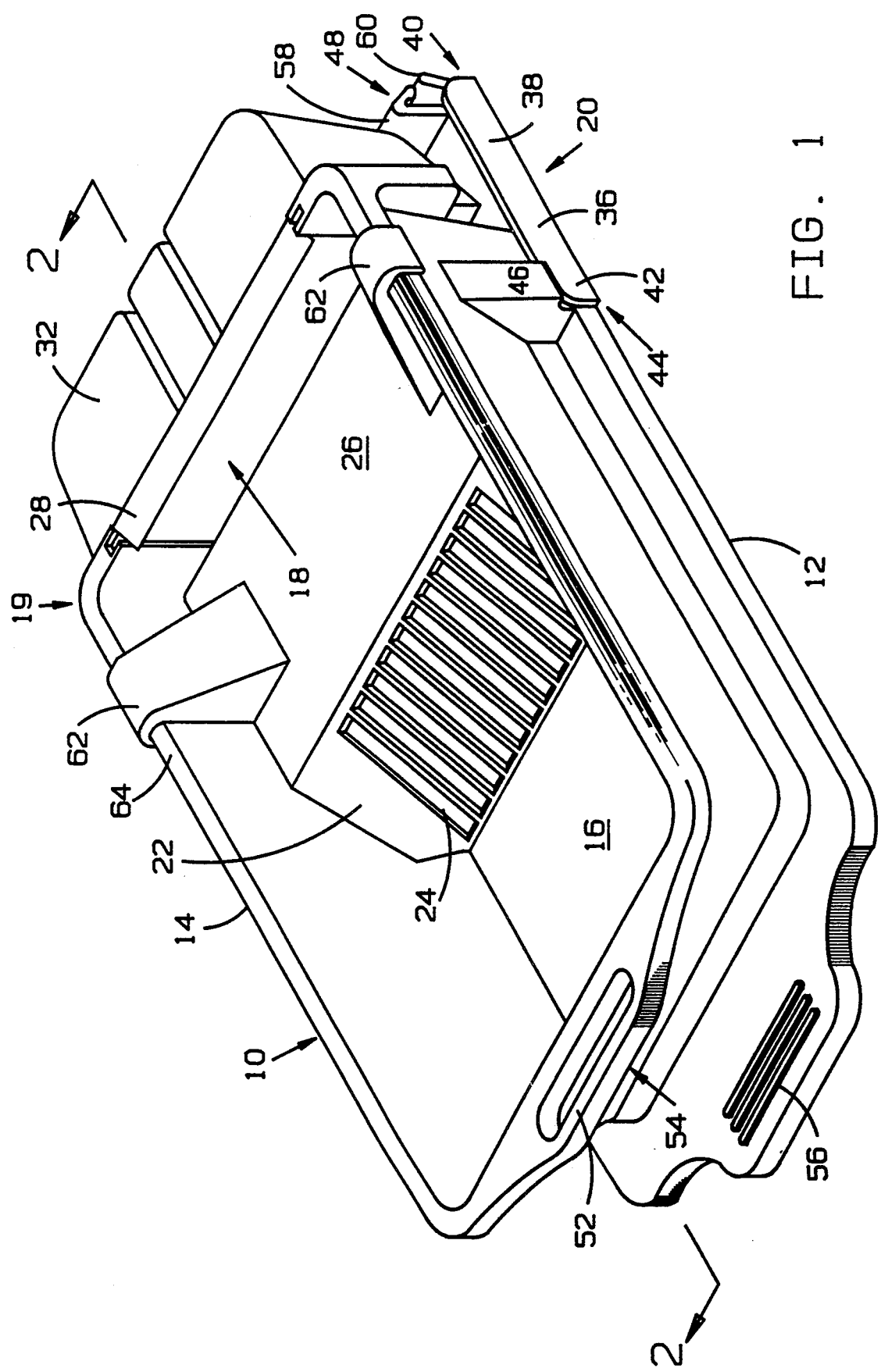
FIG. 1 is a perspective view of a preferred embodiment of the litter box according to the invention.
Figure 2:
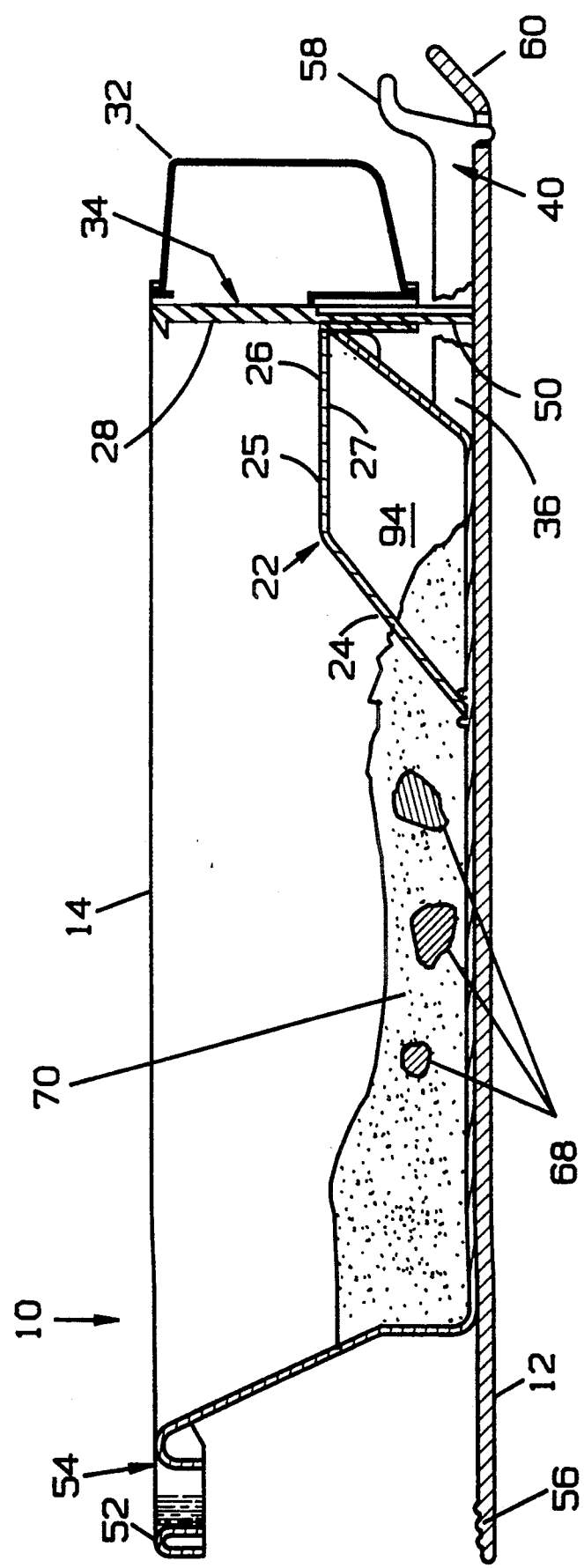
FIG. 2 is a cross section along the lines 2—2 of FIG. 1.

With reference now to FIG. 1, the litter box is generally referred to as reference numeral 10. The most preferred embodiment of the litter box 10 comprises: a base 12; a tray 14 having a bottom surface 16 and an outlet 18 at one end 19 of the tray 14; means 20 for pivotably connecting the tray 14 to the base 12 so that the tray 14 can be lifted in a pivot motion relative to the base 12; a sifting element 22 having a screen portion 24 and an at least partially solid portion 26, the sifting portion being disposed at an angle to the bottom 16 of the tray 14, and the solid portion 26 being disposed substantially parallel to the bottom 16 of the tray 14; a shutter 28 disposed at the outlet end 19 and being vertically slidable between an upper position and a lower position; and a receptacle 32 (FIG. 1) mounted to the tray 14 at a point adjacent to the shutter 28, the receptacle 32 having an inlet 34 (FIG. 2) arranged so that when the shutter 28 is in the upper position, the outlet 18 of the tray 14 and the inlet 34 of the receptacle 32 are blocked, and when the tray 14 is pivoted, the shutter 28 drops to the lower position and allows passage from the outlet 18 of the tray 14, over the shutter 28, and into the inlet 34 of the receptacle 32.

The means 20 for pivotably connecting the tray 14 to the base 12 preferably comprises at least one lever 36 which has a first end 38 pivotably connected to the base 12 to form a first pivot point 40, and a second end 42 pivotably connected to the tray 14 at a second pivot point 44. When the tray 14 is to be lifted or pivoted, it is preferred that the pivot be about the first pivot point 40. Thus, it is preferable to have a stop 46 affixed to the tray 14 at the second pivot point 44 to prevent pivoting in the clockwise direction (as viewed in FIG. 1) when the tray 14 is lifted.

Figure 8:
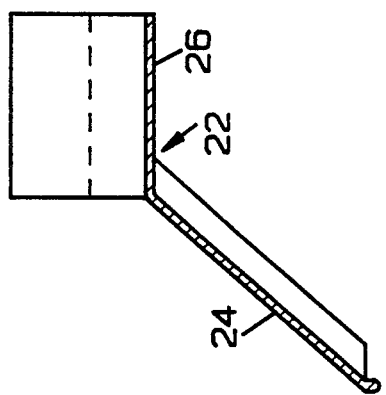
FIG. 8 is a side view of the sifting element of FIG. 6.
Figure 7:
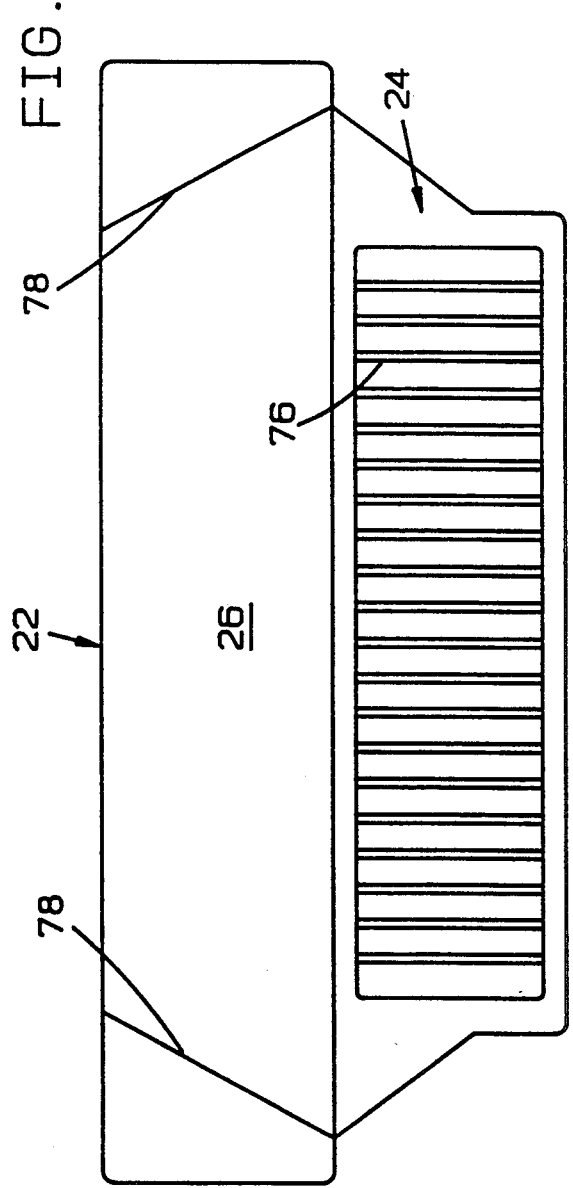
FIG. 7 is a top view of the sifting element of FIG. 6.
Figure 6:
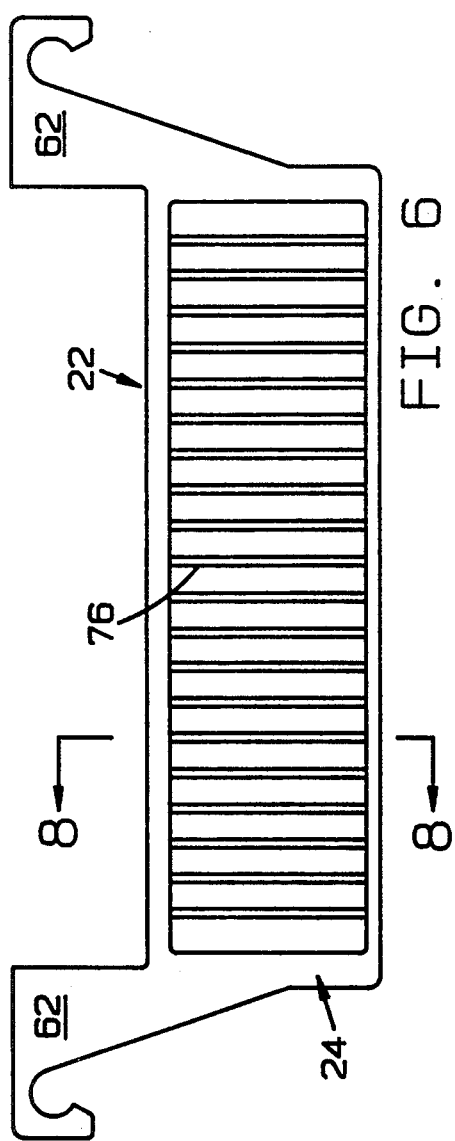
FIG. 6 is a front view of a sifting element according to the invention.

With reference to FIGS. 6–8, an illustration is given of the preferred embodiment of the sifting element 22.

With reference to FIG. 6, the sifting element 22 preferably has a screen portion 24 having screening elements such as teeth 76 disposed with gaps large enough to permit passage of litter and still prevent passage of waste material.

With reference to FIG. 7, the sifting element 22 also has a solid portion 26 which may preferably have guides 78 to cooperate with the upper surface 25 of the solid portion 26 and direct waste material into the inlet 34 of the receptacle 32. The lower surface 27 of the solid portion 26 cooperates with the bottom 16 of the tray 14 and the end 19 of the tray 14 to form a chamber 94 to catch screened litter during the cleaning process.

As shown in FIG. 8, the screen portion 24 is disposed at an angle A to the bottom 16 of the tray 14. This angle A, measured from the bottom 16 of the tray 14 to the screen portion 24 when facing the outlet 18 of the tray 14, is preferably equal to or less than 90 degrees. An angle A in the range of 30-60 degrees is more preferable still, in order to expedite passage of waste material out of the outlet 18 of the tray 14.

It is also preferable that the sifting element 22 be removable. Thus, it is preferable for the sifting element 22 to have arms 62 which fit over the sides 64 of the tray 14 to hold the sifting element 22 removably in place.

With reference now to FIGS. 9–11, a preferred embodiment of the shutter 28 will be described.

The shutter 28 is preferably a flat solid sheet 80 having a protruding top portion 82. The protruding top portion halts the downward movement of the shutter 28 when it comes into contact with the solid portion 26 of the sifting element 22. The shutter preferably has extending key elements 84 on each side which cooperate with the tray 14 to provide vertical sliding motion of the shutter 28. The shutter 29 may also preferably have a bulge 86 on the side facing the inlet 34 of the receptacle 32 to facilitate sealing of the receptacle 32 to prevent the escape of unwanted odors. This bulge could be replaced by any other structure which may be known in the art such as, for example, a strip of foam tape.

In order to facilitate the desired sliding motion of the shutter 28, the bottom edge 50 (FIG. 9) of the shutter may be connected to the base 12. This connection may be achieved through, for example, a notch 86 which may be attached to the base 12 by, for example, a rubber band (not shown).

Figure 12:
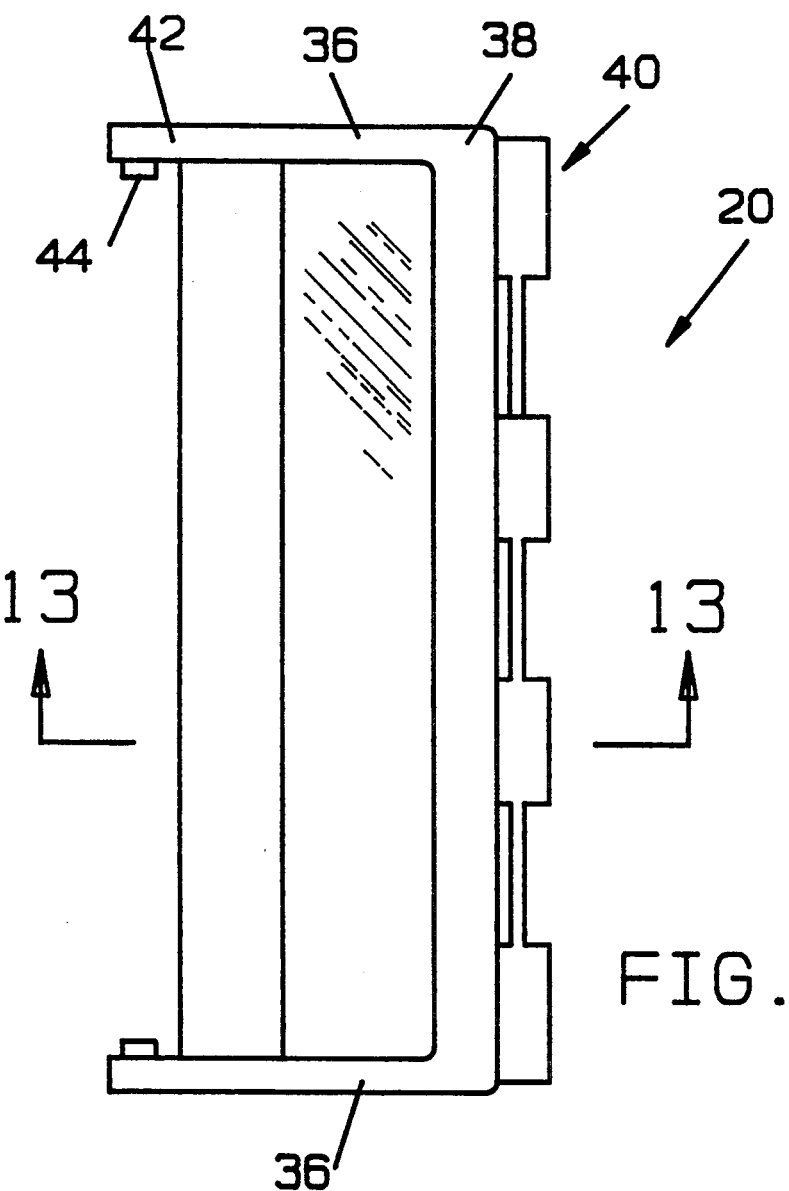
FIG. 12 is a top view of a preferred embodiment of the pivot means of the invention.
Figure 13:
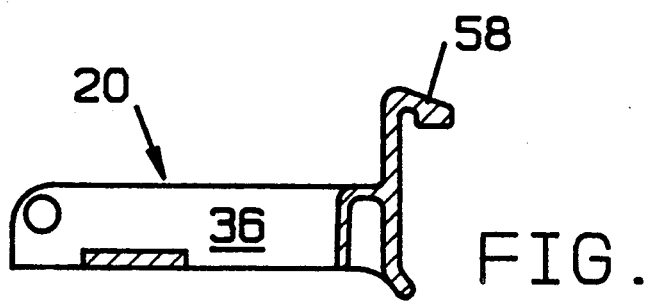
FIG. 13 is a cross section taken along the lines 13—13 of FIG. 12.
Figure 14:
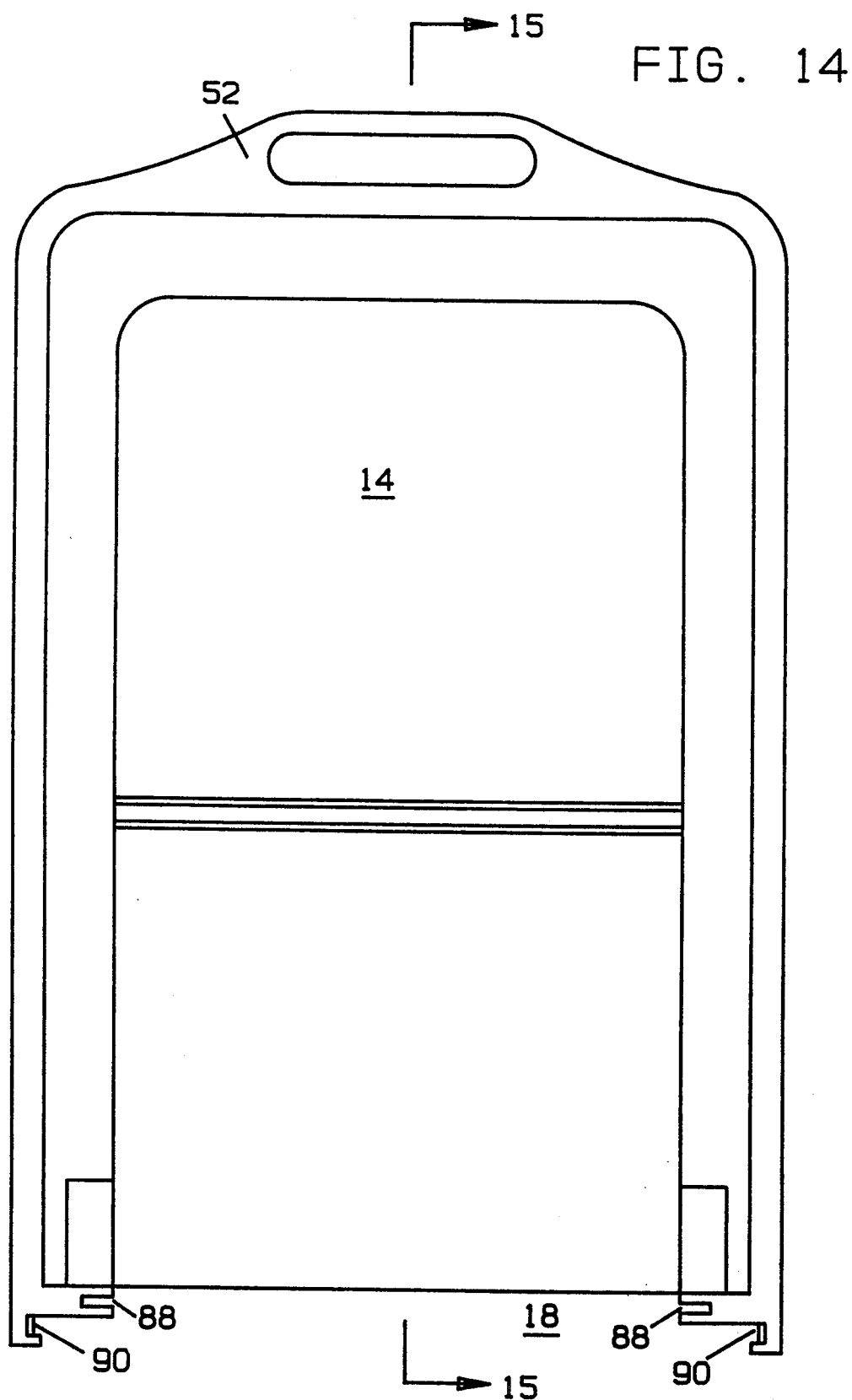
FIG. 14 is a top view of a preferred embodiment of the tray of the invention.
Figure 15:
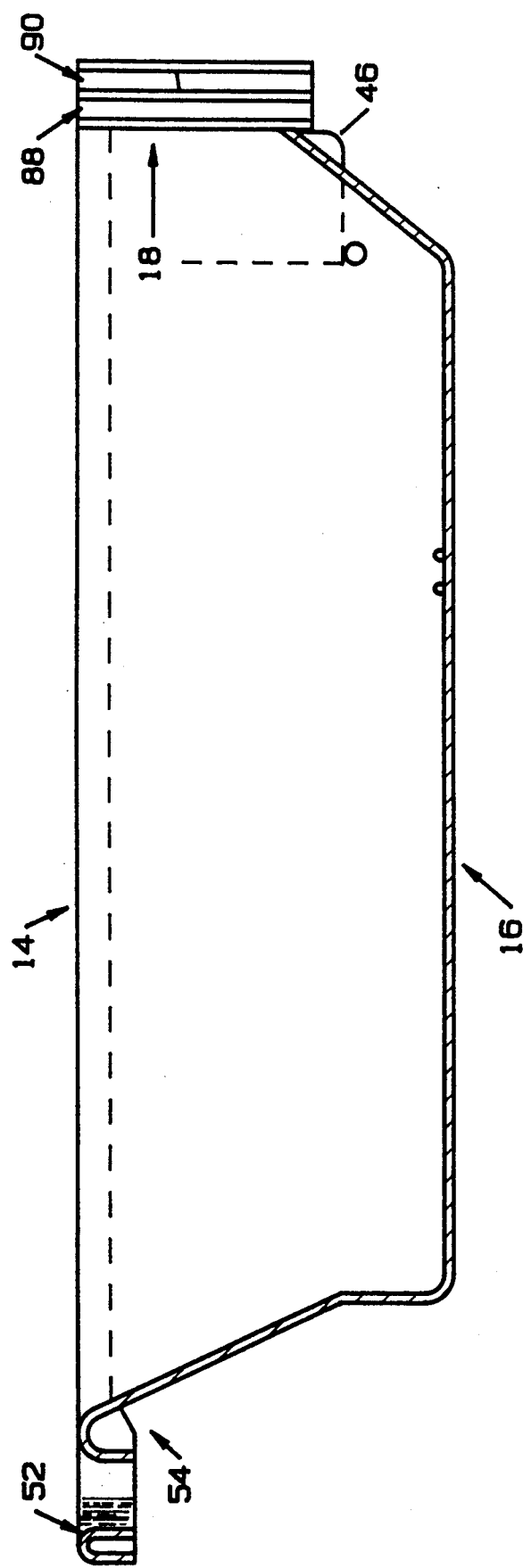
FIG. 15 is a cross section taken along the lines 15—15 of FIG. 14.
Figure 16:
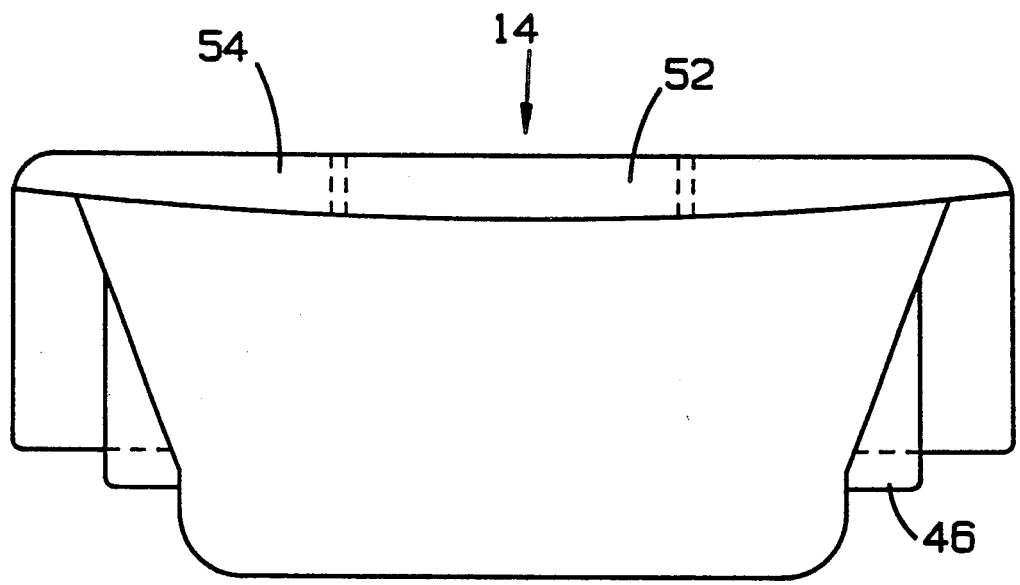
FIG. 16 is a front view of the tray of FIG. 14.
Figure 17:
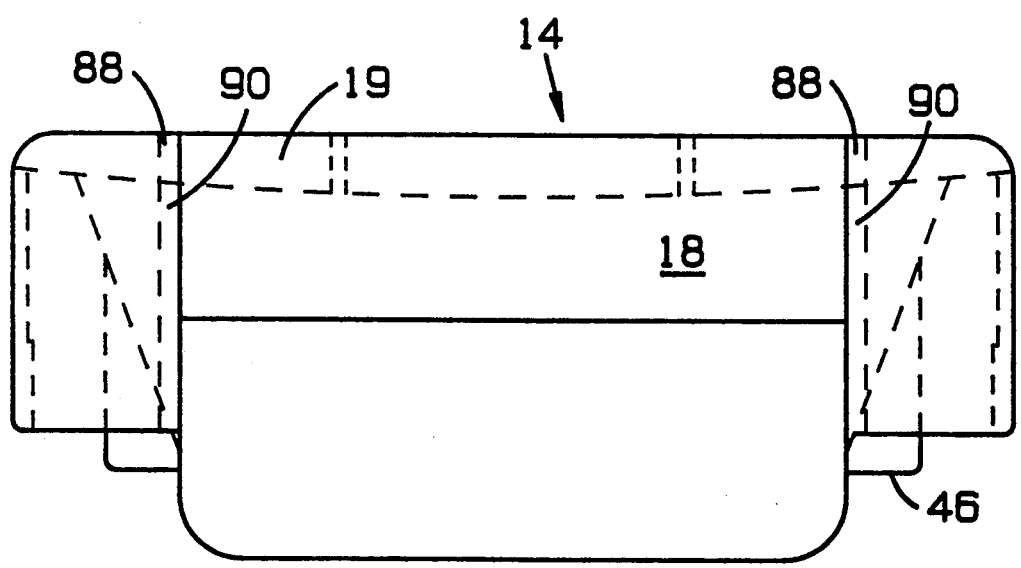
FIG. 17 is a rear view of the tray of FIG. 14.

With reference now to FIGS. 12-13, the preferred embodiment of the previously described pivot means 20 will be illustrated.

The pivot means 20 preferably has two levers 36 which are used to pivotably attach the tray 14 to the base 12. The levers 36 each have one end 38 attached to the base 12 in any fashion known in the art, to establish the first pivot point 40.

The second end 42 of each lever 36 is attached to the tray 14 in any manner known in the art to establish the second pivot point 44.

When the tray 14 is to be lowered, it is preferred that the downward pivot be initially about the second pivot point 44. Thus, the connection between the first end 38 of the lever 36 and the base 12 at the first pivot point 40 preferably additionally comprises a latch means 48 which resists pivot from a lifted position in a counterclockwise direction (as viewed in FIG. 1).

Figure 19:
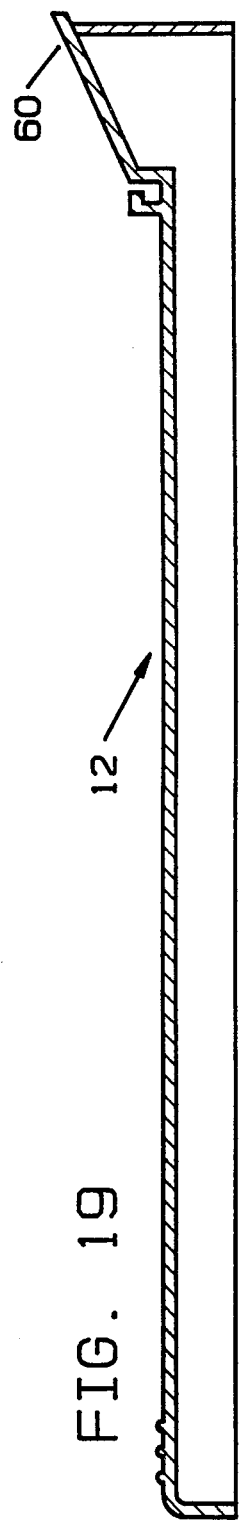
FIG. 19 is a cross section taken along the lines 19—19 of FIG. 18.

The latch means 48 preferably comprises a first curved member 58 attached to the pivot means 20, and a second curved member 60 attached to the base 12 (see FIG. 19 and description which follows). When the tray 14 is lifted, the first curved member 58 snaps over the second curved member 60 to resist the pivot motion at the first pivot point 40 during the downward pivot. The latch means 48 also serves to prevent the tray from being lifted or pivoted too far.

With reference now to FIGS. 14-17, a preferred embodiment of the tray 14 will be illustrated.

The tray 14, as previously described, has an outlet 18 at one end 19, and a handle 52 on a lifted end 54.

The attachment of the shutter 28 to the tray 14 may preferably be accomplished through a key and channel structure. The keys 84 of the shutter 28 fit slidably into channels 88 in the tray 14. The receptacle 32 may also preferably be attached to the tray 14 through a key and channel structure, such channels 90 being shown in FIG. 14.

Figure 18:
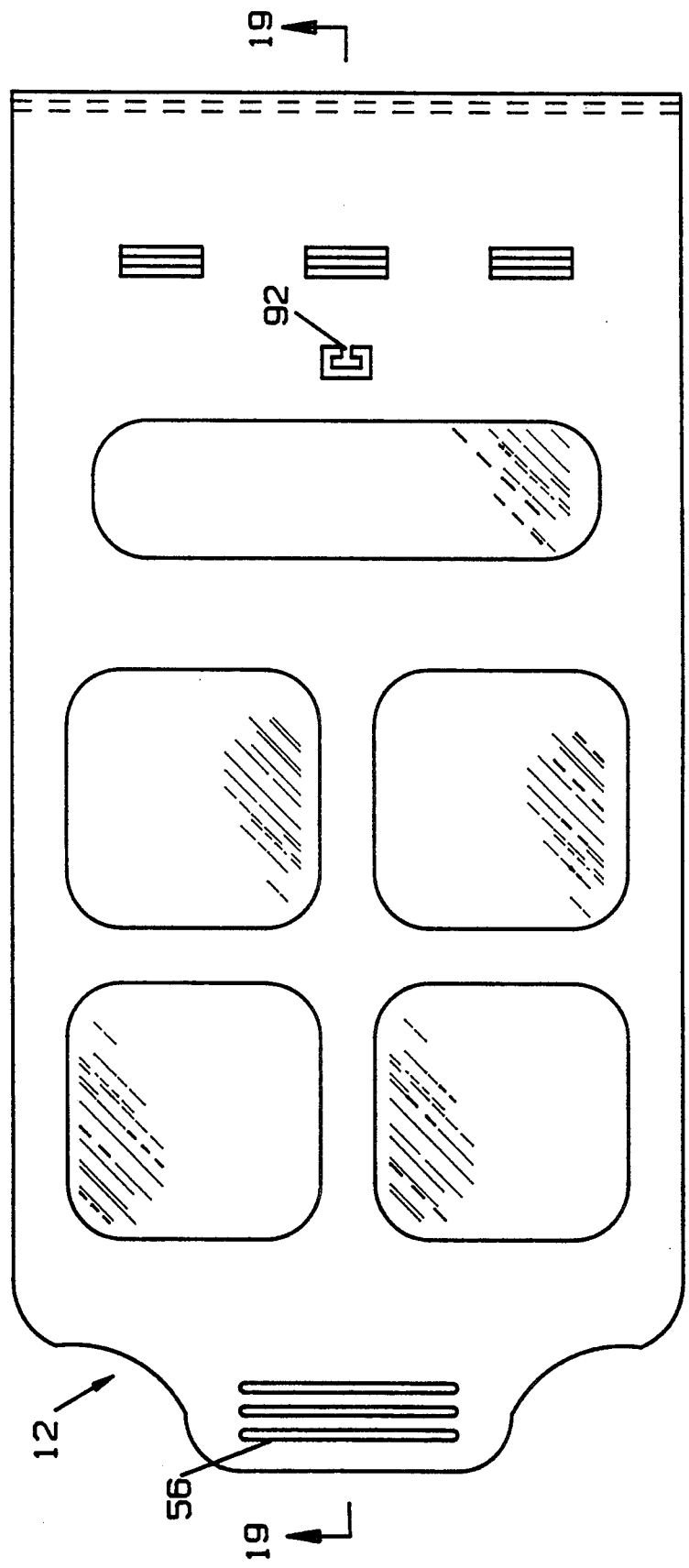
FIG. 18 is a top view of a preferred embodiment of a base element of the invention.

With reference to FIGS. 18-19, a preferred embodiment of the base 12 will be described. The base 12 may preferably have an extension 56 aligned with the handle 54 of the tray 14 to facilitate pivoting of the tray 14. The base 12 may also have a notch 92 for connection of the shutter 28 as previously described. The second curved member 60 of the latch means 48 is affixed to the base 12.

The receptacle 32 is preferably removable and also disposable. Ideally, the receptacle 32 is removed along with used litter and waste for sanitary disposal. The receptacle 32 preferably has a closure device (not shown) such as an adhesive strip which can be closed over the inlet 34 of the receptacle 32 for sanitary disposal. Preferably, new receptacles 32 having a new supply of litter can then be installed.

The litter box operates as follows. The litter box is originally oriented in a flat position (FIG. 2) with litter 70 covering the bottom 16 of the tray 14.

Figure 3:
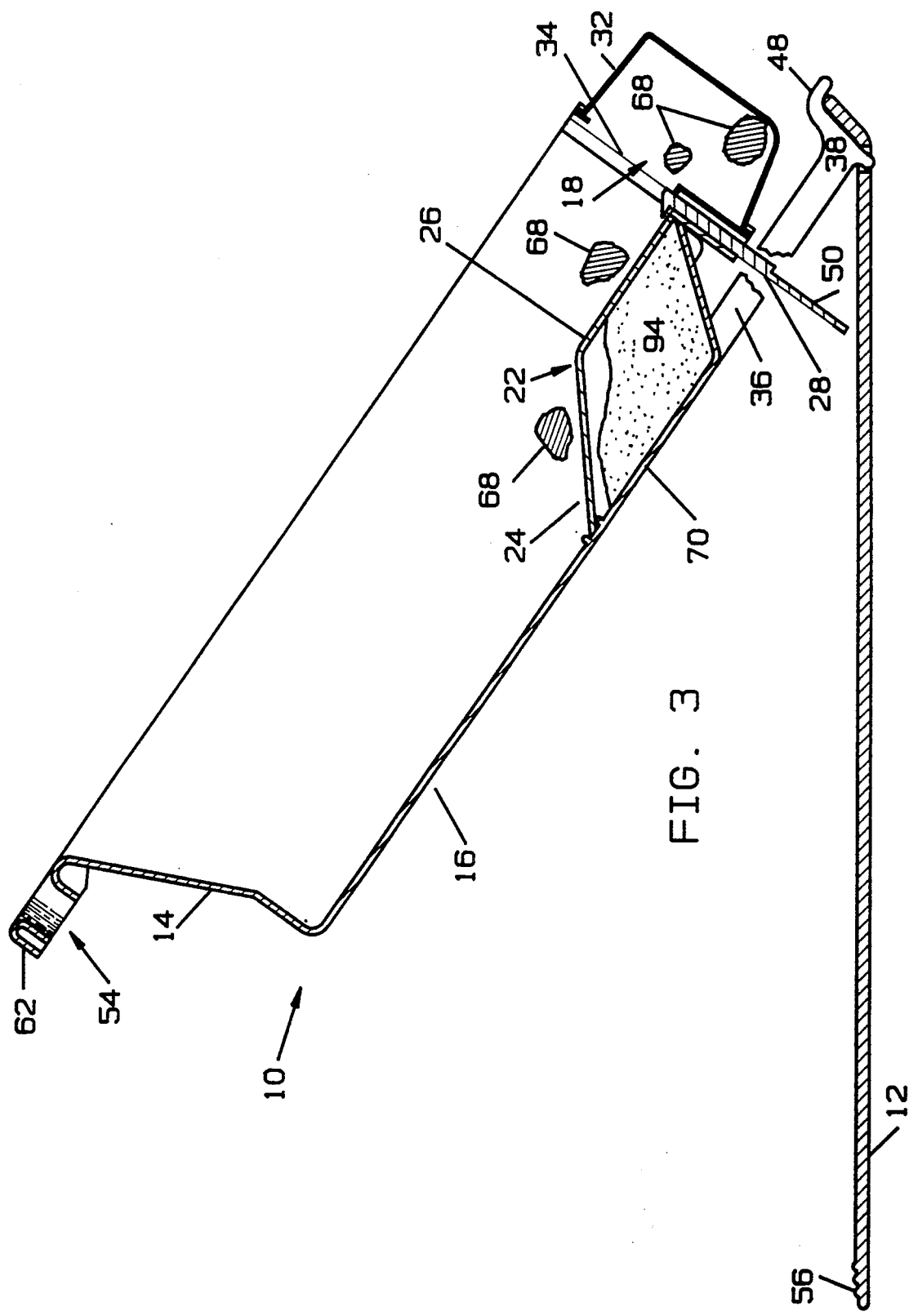
FIG. 3 is a cross section of the embodiment of FIG. 1 with the tray in a lifted position.

When the litter 70 needs to be cleaned, the tray 14 is pivoted by lifting the handle 52 of the lifted end 54 of the tray 14 as shown in FIG. 3. The shutter 28 drops to a lower position as the tray 14 is pivoted, bringing the top portion 82 of the shutter 28 in alignment with the solid portion 26 of the sifting element 22 which then allows passage from the outlet 18 of the tray 14 to the inlet 34 of the receptacle 32. The screen portion 24 of the sifting element 22 catches waste material 68 which passes over the top of the solid portion 26 of the sifting element 22 and through the outlet 18, over the shutter 28 and into the inlet 34 of the receptacle 32. Litter passes through the screen portion 24 of the sifting element 22 and is caught in the tray 14 between the solid portion 2 of the sifting element 22 and the bottom 16 of the tray 14.

Figure 4:
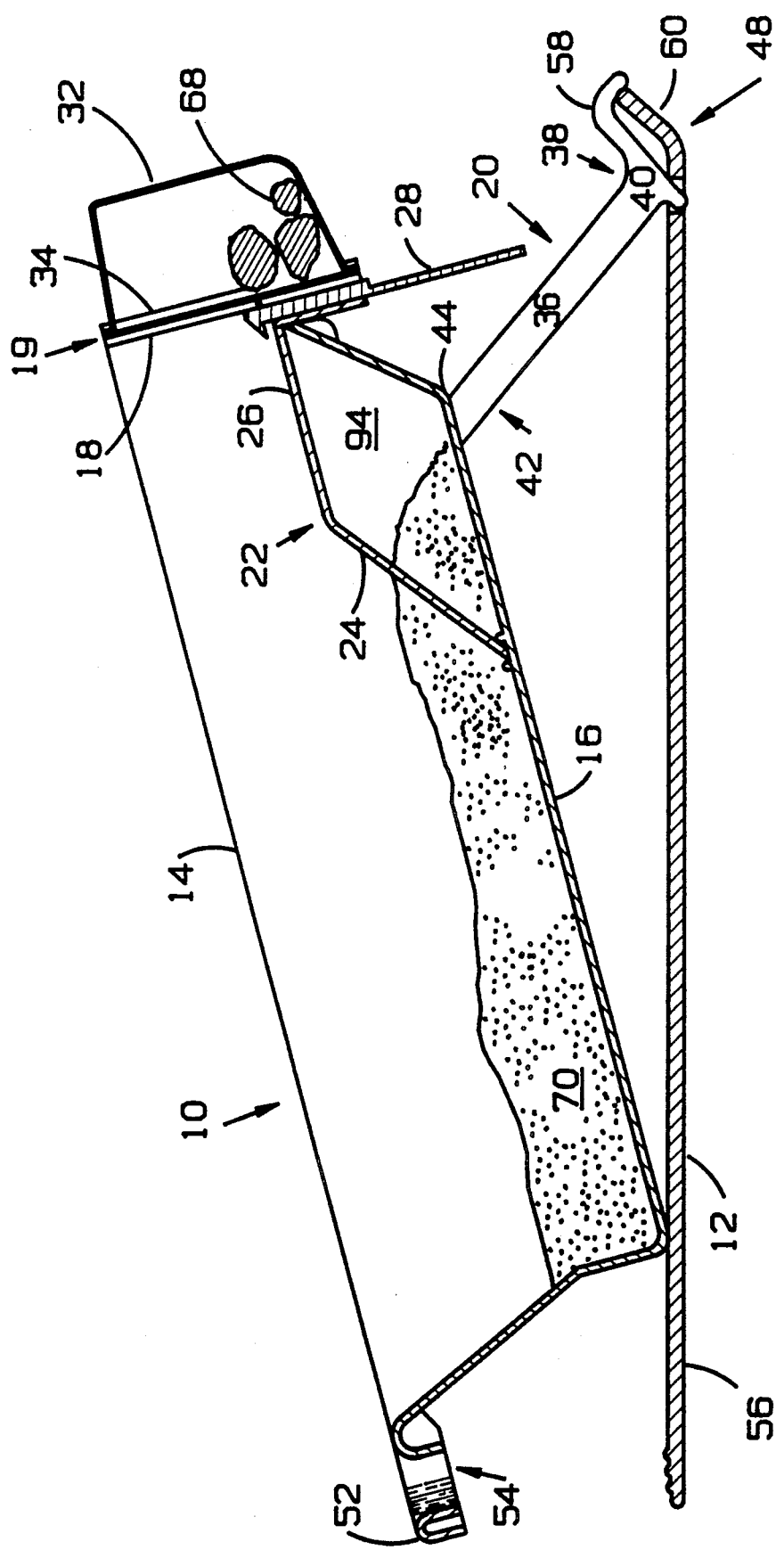
FIG. 4 is a cross section of the embodiment of FIG. 1 with the tray in a partially lowered position.

After a complete sifting, the tray is then lowered (FIG. 4). The latch means 48 resists counterclockwise pivoting at the first pivot point 40 and causes the tray 14 to pivot about the second pivot point 44. This results in the lifted end 54 of the tray 14 being lowered to a point below the outlet end 19 of the tray 14. The litter 70 passes back through the screen portion 24 of the sifting element 22 and is redistributed along the bottom 16 of the tray 14. A gentle pull on the handle 52 will then disengage the latch means 48 and return the tray 14 to the horizontal position of FIG. 2 for another period of use.

Figure 5:
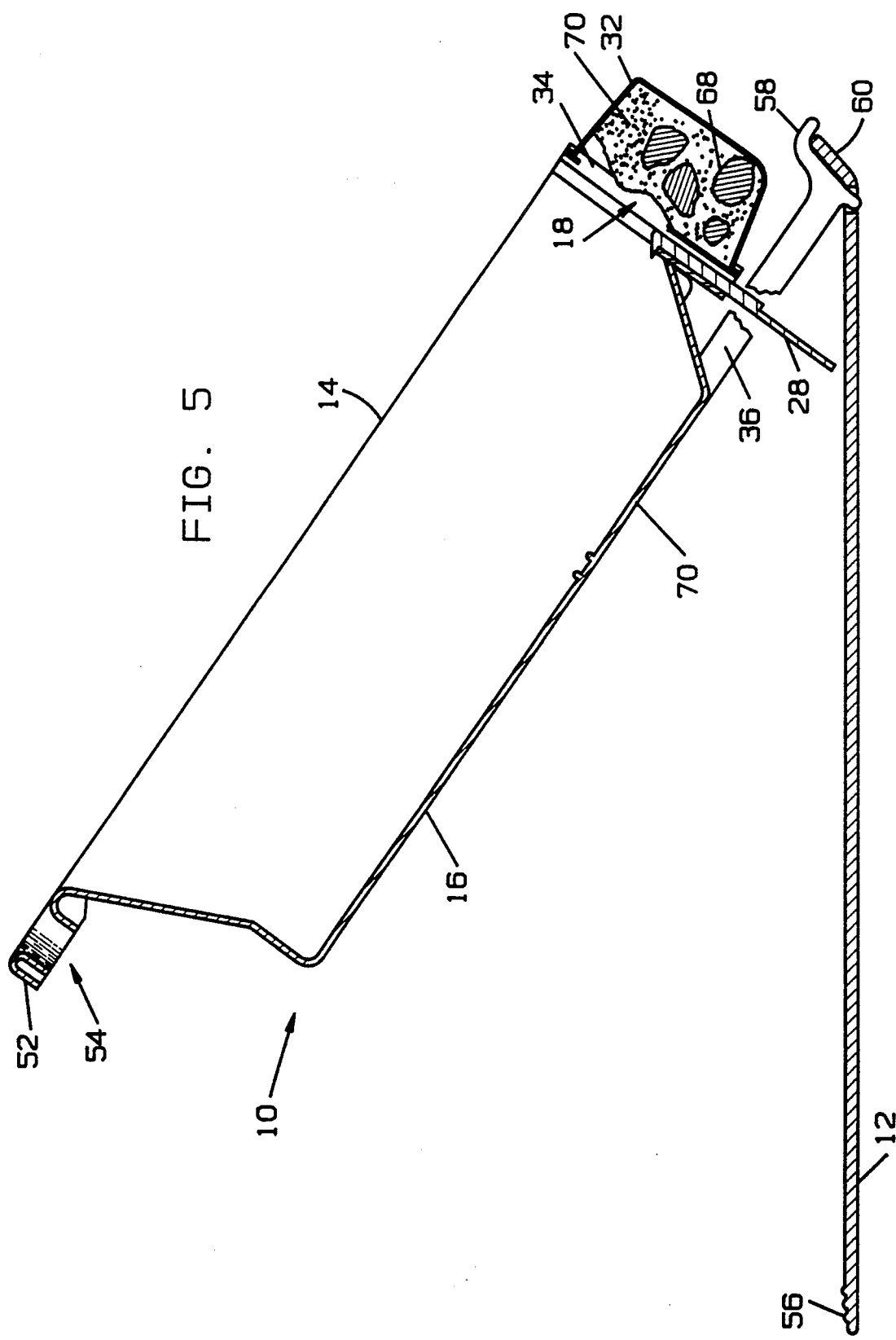
FIG. 5 is a cross section of the embodiment of FIG. 1 with the sifting element removed for emptying of the tray.

When the litter 70 has been used and re-used to the point where it must be replaced, the sifting element 22 can be removed. The tray 14 is then pivoted as previously outlined (FIG. 5) and all litter 70 and waste material 68 pass through the outlet 18 into the receptacle 32. The receptacle 32 is removed and discarded, and the tray 14 is then lowered, if not already lowered, into position for further use. A new receptacle 32, preferably filled with a new supply of litter 70, can then be opened and installed, the above procedure being followed to distribute the litter 70 over the bottom 16 of the tray 14.

The above description is of a preferred embodiment of the invention and is not intended to be a limitation on the scope of the appended claims or equivalents thereof.

I claim:

1. A litter box, comprising:
   a tray having a bottom, a plurality of sides, and an outlet at one side of the tray; and
   a sifting element attached within the tray and having a screen portion and a solid portion, the screen portion being disposed at an angle, facing the outlet of the tray, of 90 degrees or less, and greater than 0 degrees, as measured from the bottom of the tray to the screen portion, and the solid portion extending from the screen portion to the outlet of the tray whereby, when the tray is tilted towards the outlet, litter passes through the screen portion and is caught between the solid portion and the bottom of the tray, and waste material is caught by the screen portion and passes through the outlet.

2. A litter box according to claim 1, further comprising:
   a base;
   means for pivotably connecting the tray to the base so that the tray can be lifted in a pivot motion relative to the base;
   a shutter, disposed at the outlet of the tray, the shutter being vertically slidable between a raised position and a lowered position; and
   a receptacle, mounted to the tray and adjacent to the shutter, and having an inlet arranged so that, when the shutter is in the raised position, the outlet of the tray and the inlet of the receptacle are blocked, and when the tray is pivoted, the shutter drops to the lowered position to allow passage from the outlet of the tray to the inlet of the receptacle.

3. A litter box according to claim 2, wherein the means for pivotably connecting the tray to the base comprises at least one lever having a first end pivotably attached to the base at a first pivot point.

4. A litter box according to claim 3, wherein said at least one lever has a second end pivotably attached to the tray at a second pivot point.

5. A litter box according to claim 4, further comprising means for resisting lowering of the tray at the first pivot point of said at least one lever, so that lowering of the tray results in pivoting at the second pivot point whereby a lifted end of the tray can be lowered to a point below the outlet end of the tray.

6. A litter box according to claim 5, wherein the means for resisting lowering of the tray comprises a latch means having a first curved member affixed to an end of said at least one lever at the first pivot point, and a second curved member shaped for a snap fit with the first curved member and being affixed to the base.

7. A litter box according to claim 6, wherein the shutter is attached to the base to facilitate vertical motion of the shutter when the tray is lifted.

8. A litter box according to claim 2, wherein the sifting element is removable.

9. A litter box according to claim 2, wherein the receptacle is removable.

10. A litter box according to claim 9, wherein the receptacle is disposable.

11. A litter box according to claim 1, wherein the angle is between 30–60 degrees.

* * * * *